US011232684B2

(12) United States Patent
Gurjar et al.

(10) Patent No.: US 11,232,684 B2
(45) Date of Patent: Jan. 25, 2022

(54) SMART LUMINAIRE GROUP CONTROL USING INTRAGROUP COMMUNICATION

(71) Applicant: APPLETON GRP LLC, Rosemont, IL (US)

(72) Inventors: Ravindra Viraj Gurjar, Pune (IN); Timothy E. Graff, Arlington Heights, IL (US); Yicheng Peter Pan, Leander, TX (US)

(73) Assignee: APPLETON GRP LLC, Rosemont, IL (US)

( * ) Notice: Subject to any disclaimer, the term of this patent is extended or adjusted under 35 U.S.C. 154(b) by 0 days.

(21) Appl. No.: 16/786,219

(22) Filed: Feb. 10, 2020

(65) Prior Publication Data

US 2021/0074133 A1   Mar. 11, 2021

(30) Foreign Application Priority Data

Sep. 9, 2019   (IN) .............................. 201921036250
Sep. 9, 2019   (IN) ........................... 201921036250P
Sep. 18, 2019  (IN) .............................. 201921037587

(51) Int. Cl.
*G08B 5/36* (2006.01)
*H04L 12/24* (2006.01)
(Continued)

(52) U.S. Cl.
CPC ............ *G08B 5/36* (2013.01); *H04L 41/0686* (2013.01); *H04L 67/12* (2013.01); *H04W 4/38* (2018.02)

(58) Field of Classification Search
CPC .... G08B 5/00; G08B 5/22; G08B 5/36; H04L 41/0686; H04L 67/12; H04W 4/38; H05B 47/00; H05B 47/19; H05B 47/18
See application file for complete search history.

(56) References Cited

U.S. PATENT DOCUMENTS 6,548,967 B1   4/2003  Dowling et al.
6,646,545 B2   11/2003 Bligh
(Continued)

FOREIGN PATENT DOCUMENTS

| CA | 2708978 C | 3/2016 |
| EP | 0872163 B1 | 8/1999 |
| WO | WO-2018/191791 A1 | 10/2018 |

OTHER PUBLICATIONS

U.S. Appl. No. 16/738,898, Event Indications of Hazardous Environment Luminaires Using Visual Sequences, filed Jan. 9, 2020.
(Continued)

*Primary Examiner* — Ryan W Sherwin
(74) *Attorney, Agent, or Firm* — Marshall, Gerstein & Borun LLP (57) ABSTRACT

A smart luminaire system in which a primary luminaire controls and/or communicates with a set of one or more secondary luminaires may be disposed in a hazardous environment, such as an industrial process plant, manufacturing facility, oil refinery, etc. The primary luminaire may send driving commands to the set of secondary luminaires via an analog portion of a hybrid wired communication interface, and the driving commands may cause a driver of a second luminaire to energize on-board illumination source(s) at various intensities. The primary luminaire may send and/or receive administrative messages to/from the secondary luminaires via a digital portion of its hybrid wired communication interface. The smart luminaire system may be a stand-alone system, or may communicate with a controller or back-end system via a wireless communication interface of the primary luminaire, e.g., to receive control instructions and/or to send consolidated administrative messages on behalf of the smart luminaire system.

27 Claims, 4 Drawing Sheets

(51) Int. Cl.
    *H04L 29/08* (2006.01)
    *H04W 4/38* (2018.01)

(56) References Cited

U.S. PATENT DOCUMENTS

| | | | |
|---|---|---|---|
| 7,199,724 B2 | 4/2007 | Danvir et al. |
| 7,221,104 B2 | 5/2007 | Lys et al. |
| 7,309,965 B2 | 12/2007 | Dowling et al. |
| 7,333,903 B2 | 2/2008 | Walters et al. |
| 7,546,168 B2 | 6/2009 | Walters et al. |
| 7,614,767 B2 | 11/2009 | Zulim et al. |
| 7,683,301 B2 | 3/2010 | Papamichael et al. |
| 7,781,713 B2 | 8/2010 | Papamichael et al. |
| 7,859,398 B2 | 12/2010 | Davidson et al. |
| 7,915,829 B2 | 3/2011 | Keller et al. |
| 8,364,325 B2 | 1/2013 | Huizenga et al. |
| 8,731,689 B2 | 5/2014 | Platner et al. |
| 8,757,847 B2 | 6/2014 | Seff et al. |
| 8,942,564 B2 | 1/2015 | Jovicic et al. |
| 9,049,756 B2 | 6/2015 | Klusmann et al. |
| 9,080,747 B1 | 7/2015 | Hetrick |
| 9,119,169 B2 | 8/2015 | Luo et al. |
| 9,143,230 B2 | 9/2015 | Casaccia et al. |
| 9,215,784 B2 | 12/2015 | Platner et al. |
| 9,247,620 B2 | 1/2016 | Gritti et al. |
| 9,398,588 B2 | 7/2016 | Wang et al. |
| 9,473,248 B2 | 10/2016 | Yang et al. |
| 9,520,939 B2 | 12/2016 | Jovicic et al. |
| 9,612,585 B2 | 4/2017 | Aggarwal et al. |
| 9,622,330 B2 | 4/2017 | Lashina et al. |
| 9,660,727 B2 | 5/2017 | Jovicic et al. |
| 9,679,448 B2 | 6/2017 | Koosha et al. |
| 9,686,838 B2 | 6/2017 | Elwell et al. |
| 9,721,442 B2 | 8/2017 | Denteneer et al. |
| 9,735,868 B2 | 8/2017 | Jovicic et al. |
| 9,754,466 B2 | 9/2017 | Simmons |
| 9,813,150 B1 | 11/2017 | Bitra et al. |
| 9,832,826 B2 | 11/2017 | Rodriguez et al. |
| 9,843,386 B2 | 12/2017 | Baggen et al. |
| 9,857,162 B1 | 1/2018 | Gum et al. |
| 9,871,585 B2 | 1/2018 | Rietman et al. |
| 9,930,166 B2 | 3/2018 | Garcia Morchon |
| 9,930,758 B2 | 3/2018 | Jayawardena et al. |
| 9,955,541 B2 | 4/2018 | Dowling et al. |
| 9,955,549 B2 | 4/2018 | Zhang et al. |
| 9,961,747 B2 | 5/2018 | Kumar et al. |
| 9,970,639 B2 | 5/2018 | Yadav et al. |
| 10,006,592 B2 | 6/2018 | Carney et al. |
| 10,009,100 B2 | 6/2018 | Jovicic et al. |
| 10,020,881 B2 | 7/2018 | Jovicic |
| 10,021,770 B2 | 7/2018 | Turvy, Jr. et al. |
| 10,027,409 B2 | 7/2018 | Rietman et al. |
| 10,034,314 B2 | 7/2018 | White et al. |
| 10,037,673 B1* | 7/2018 | Gray ............ H05B 47/11 |
| 10,040,007 B2 | 8/2018 | Adam |
| 10,064,248 B2 | 8/2018 | Janik et al. |
| 10,068,442 B2 | 9/2018 | Chong et al. |
| 10,117,300 B2 | 10/2018 | Doheny et al. |
| 10,128,948 B2 | 11/2018 | Jovicic |
| 10,135,696 B2 | 11/2018 | Koosha et al. |
| 10,190,759 B2 | 1/2019 | Yadav et al. |
| 10,194,513 B2 | 1/2019 | Jayawardena et al. |
| 10,260,722 B2 | 4/2019 | Treible, Jr. et al. |
| 10,355,781 B2 | 7/2019 | Verma et al. |
| 10,371,345 B2 | 8/2019 | Nolan et al. |
| 10,378,738 B1 | 8/2019 | Davis |
| 10,378,748 B2 | 8/2019 | Ott |
| 10,383,191 B2 | 8/2019 | Jayawardena et al. |
| 10,400,996 B2 | 9/2019 | Holder et al. |
| 10,401,007 B1 | 9/2019 | York et al. |
| 10,408,442 B2 | 9/2019 | Treible, Jr. et al. |
| 10,422,494 B2 | 9/2019 | Moghal et al. |
| 10,510,222 B2 | 12/2019 | Eddins et al. |
| 2014/0327362 A1 | 11/2014 | Ashdown |
| 2015/0097686 A1* | 4/2015 | Fadell ............ G08B 21/18 340/632 |
| 2016/0286627 A1* | 9/2016 | Chen ............ H05B 47/105 |
| 2017/0079117 A1* | 3/2017 | Jayawardena ......... H05B 47/19 |
| 2018/0205459 A1* | 7/2018 | Verma ............ H05B 47/195 |
| 2018/0288860 A1* | 10/2018 | Vendetti ............ F21V 23/06 |
| 2019/0023460 A1 | 1/2019 | Veness |
| 2019/0159322 A1 | 5/2019 | Jayawardena et al. |
| 2019/0208598 A1 | 7/2019 | Davis et al. |
| 2019/0215935 A1 | 7/2019 | Trublowski et al. |
| 2019/0226666 A1 | 7/2019 | Davis et al. |
| 2019/0234603 A1 | 8/2019 | Treible, Jr. et al. |
| 2019/0257496 A1 | 8/2019 | Pyshos et al. |
| 2019/0257934 A1 | 8/2019 | Riley et al. |
| 2019/0261301 A1 | 8/2019 | Riley et al. |
| 2019/0277482 A1 | 9/2019 | Newton |
| 2019/0285259 A1 | 9/2019 | Tickner et al. |
| 2019/0335567 A1* | 10/2019 | Boudreau ............ H05B 47/12 |

OTHER PUBLICATIONS

U.S. Appl. No. 16/790,041, Connected Controls Infrastructure, filed Feb. 13, 2020.
U.S. Appl. No. 16/793,121, Luminaire as an Intrinsically Safe Power Source, filed Feb. 18, 2020.
U.S. Appl. No. 16/786,213, Smart Dimming & Sensor Failure Detection as Part of Built in Daylight Harvesting Inside the Luminaire, filed Feb. 10, 2020.
IN Application No. 201921035199, Event Indications of Hazardous Environment Luminaires Using Visual Sequences, filed Aug. 31, 2019.
IN Application No. 201921036250, Smart Luminaire Group Control Using Intragroup Communication, filed Oct. 7, 2019.
IN Application No. 201921037587, Smart Luminaire Group Control Using Intragroup Communication, filed Sep. 18, 2019.
IN Application No. 201921036251, Connected Controls Infrastructure, filed Sep. 9, 2019.
IN Application No. 201921041224, Connected Controls Infrastructure, filed Oct. 11, 2019.
IN Application No. 201921036251, Connected Controls Infrastructure, filed Oct. 19, 2019.
IN Application No. 202021003289, Luminaire as an Intrinsically Safe Power Source, filed Jan. 24, 2020.
IN Application No. 201921037990, Sensor Device Design and Mounting Construction for Connected LED Lighting, filed Sep. 20, 2019.
IN Application No. 201921038344, Sensor Device Design and Mount for Affixing Sensor Device to a Luminaire, filed Sep. 23, 2019.
IN Application No. 201921036250, Smart Luminaire Group Control Using Intragroup Communication, filed Sep. 9, 2019.
First Examination Report for India Application No. 201921036250, dated May 31, 2021.
International Search Report and Written Opinion for Application No. PCT/US2020/047405, dated Oct. 27, 2020.

* cited by examiner

SMART LUMINAIRE GROUP CONTROL USING INTRAGROUP COMMUNICATION

CROSS REFERENCE TO RELATED APPLICATIONS

This application claims priority to Indian Patent Application No. 201921036250, which was filed on Sep. 9, 2019 and entitled "Smart Luminaire Group Control Using Intragroup Communication," and Indian Patent Application No. 201921037587, which was filed on Sep. 18, 2019 and entitled "Smart Luminaire Group Control Using Intragroup Communication," the entire contents of each of which are hereby incorporated by reference.

FIELD OF THE DISCLOSURE

This disclosure relates to communication between luminaires, lighting units, and/or light fixtures in hazardous environments.

BACKGROUND

The background description provided within this document is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

Intrinsically safe and/or explosion proof luminaires, lighting units, and light fixtures provide general, ambient light and/or task or focused light within hazardous environments such as industrial process plants, manufacturing facilities, oil refineries, power-generating systems, mines, and the like. As such, intrinsically safe and/or explosion proof luminaires, lighting units, and light fixtures must comply with all standards and/or regulatory rules that are applicable to the particular hazardous environment in which they are disposed, e.g., to prevent ignition and/or explosion of hazardous atmospheric mixtures such as flammable gases and/or dust, to protect electronics within the luminaire from being compromised or damaged, to contain any explosion that may occur, etc. Such luminaires may be rated by Class, Division, and Group. For example, a Class 1, Division 1, Group D, E, and F is a commonly required rating for products that are located in hazardous environments within the petrochemical industry, in which flammable vapors may be present. Generally speaking, intrinsically safe and/or explosion proof luminaires, lighting units, and light fixtures are designed to limit undesirable and/or dangerous effects of thermal and/or electrical energy generated during both their normal use and maintenance, as well as during fault conditions. For ease of reading, intrinsically safe and/or explosion proof luminaires, lighting units, and/or light fixtures that are located in hazardous environments are generically referred to herein as "hazardous environment (HE) luminaires, lighting units, and/or light fixtures", and/or simply as "luminaires, lighting units, and/or light fixtures."

Known hazardous environment luminaires, lighting units, and light fixtures, though, are typically either factory-configured to generate a particular intensity of visible light, and/or attached to timers or sensors, such as motion sensors or ambient light sensors, for automatic on/off control based on time and/or sensor readings. More recently, "smart" luminaires, lighting units, and light fixtures have been designed to use computing functionality and network connectivity to provide more sophisticated features, such as daylight harvesting (i.e., adjusting intensity by dimming or brightening based on the intensity of ambient light) and advanced motion detection (i.e., switching lights on and off based on the predicted motion of an individual through a facility).

For example, some luminaires utilize a wireless communication interface to communicate driving or control commands and/or status updates as needed to provide smart features. In some arrangements, luminaires send and receive wireless transmissions via wireless communication protocols such as Bluetooth® or other short-range protocol, Wi-Fi, Wireless Highway Addressable Remote Transducer Protocol (WirelessHART®), or other wireless communication protocols. In other arrangements, the luminaire sends, via a wireless communication network, wireless transmissions to a host computer or back-end system for processing and forwarding via the wireless communication network.

However, implementing smart lighting systems that communicate over wireless networks can be difficult in hazardous environments requiring a large number of HE luminaires. Smart lighting units are generally much more expensive than traditional lighting units, especially in at the scale required for a large facility needing a large number of lighting units. Moreover, adding wireless connectivity features to existing traditional lighting units can be difficult because changes in the mechanical design of the lighting units may be necessary to accommodate the wireless radios and antennas required to enable wireless connectivity. Furthermore, increasing the total number of lighting units with wireless connectivity increases the number of wireless nodes within the wireless network, which affects bandwidth requirements and slows down responsiveness over the wireless network. This is especially problematic in hazardous environments in which alerts and other critical messages related to spills or other safety conditions within the plant are communicated over the wireless network, because delays in sending such messages can lead to dangerous conditions within the already hazardous environment.

SUMMARY

The present application provides a smart luminaire system in which a primary luminaire of a group of luminaires communicates wirelessly with other nodes of a wireless network within a hazardous environment, and one or more other luminaires in the group (e.g., one or more "secondary" luminaires) communicate with the primary luminaire via respective hybrid wired communication interfaces. In particular, a hybrid wired communication interface of a luminaire includes both a digital component or portion and an analog component or portion so that both digital and analog signals may delivered over a common, integral, or single, physical transmission medium (such as a wire, a cable, etc.). The digital component may deliver administrative messages (e.g., such as alert messages, status messages, sensor data, configuration messages, and/or other types of messages that do not include any control or driving instructions) between the primary luminaire and a secondary luminaire, while the analog component may deliver driving commands from the primary luminaire to the secondary luminaire. Accordingly, the primary luminaire may send driving commands to the secondary luminaires via the analog component of its hybrid wired communication interface and may send administrative messages to (and receive administrative messages from) the secondary luminaires via the digital component of its hybrid wired communication interface. In some embodiments, the primary luminaire receives control and/or driving instructions from other nodes of the wireless network, e.g., to control the illuminations source(s) of the primary luminaire, and/or to control the illumination source(s) of one or more of the secondary luminaires. For example, the primary luminaire may receive control instructions generated by a controller connected to the wireless network, and/or may receive control instructions generated by another primary luminaire via the wireless network. Additionally or alternatively, in some scenarios, the primary luminaire may receive, from another primary luminaire via the wireless network, control instructions which have been generated by a controller and sent to the another primary luminaire for forwarding to the primary luminaire. For example, control instructions from one primary luminaire may be routed via a wireless gateway for delivery to another primary luminaire.

In some embodiments, the primary luminaire is configured to control secondary luminaires without instructions from external devices as needed, e.g., in the event that a wireless network is malfunctioning, or when the smart luminaire system is a stand-alone system.

While operating under the stand-alone mode, one primary luminaire along with its secondary luminaires will form one logical group. For instance, the primary luminaire may generate driving commands for the secondary luminaires based on sensor data from one or more sensors that are on-board or communicatively connected to the primary luminaire, based on administrative messages which the primary luminaire receives from one or more of the secondary luminaires, and/or based other conditions. For example, if a motion sensor associated with the primary luminaire detects motion, the primary luminaire may generate driving commands for itself or for the secondary luminaires based on the detected motion. Similarly, if a motion sensor associated with one of the secondary luminaires detects motion, an administrative message delivered to the primary luminaire from the secondary luminaire may include an indication of the detected motion, and the primary luminaire may generate driving commands for itself or for the secondary luminaires based on the detected motion.

As another example, if a light sensor associated with the primary luminaire detects ambient light, the primary luminaire may generate driving commands for itself or the secondary luminaires based on the detected ambient light. Similarly, if a light sensor associated with one of the secondary luminaires detects ambient light, an administrative message delivered to the primary luminaire from the secondary luminaire may include an indication of the detected ambient light, and the primary luminaire may generate driving commands for itself or for the secondary luminaires based on the detected ambient light. For instance, when brighter ambient light is detected in a particular are, less intense illumination may be needed to provide lighting for the area. Accordingly, driving commands for illumination sources of a primary luminaire or secondary luminaires in that area may indicate a decreased intensity based on ambient light detected by sensors of the primary luminaire or the secondary luminaires.

Accordingly, in a stand-alone mode, the primary luminaire may generate driving commands for itself and for all of the secondary luminaires in the group on its own based on sensor data from the primary and secondary luminaires of the group, without a need for any input from a centralized lighting control system.

Consequently, by using intra-luminaire communication via one or more hybrid wired communication interfaces, smart luminaire features may be enabled for all luminaires of the smart luminaire system without requiring wireless connectivity for each and every luminaire of the system. Advantageously, because not every luminaire in the smart luminaire system must be connected to the wireless network, the smart luminaire system can be implemented in a facility without dramatically increasing the facility's overall bandwidth needs and without significantly slowing down responsiveness over the wireless network of the facility, e.g., for purposes other than ambient and/or task lighting. Accordingly, the smart luminaire system can be implemented without delaying the transmission of alerts and other critical messages related to spills or other safety conditions within the plant over the wireless network.

Furthermore, because many existing luminaires within the plant may already be configured to use analog wired communication, in some examples, existing luminaires may easily be integrated into the smart luminaire system as analog secondary luminaires, e.g., by connecting the existing luminaires to primary luminaires via respective analog wired communication interfaces native to the existing luminaires. In some examples, a single analog driving command from a primary luminaire may indicate a particular intensity setpoint for illumination sources of multiple or all of the secondary luminaires.

In an embodiment, a luminaire system is provided. The luminaire system comprises: a primary luminaire communicatively connected to one or more secondary luminaires via one or more hybrid, wired communication interfaces to one or more hybrid wired communication links, the primary luminaire including: one or more processors; one or more illumination sources; one or more drivers; the one or more hybrid, wired communication interfaces; and one or more memories storing a set of computer-executable instructions that, when executed by the one or more processors, cause the primary luminaire to: send a driving command to a particular secondary luminaire of the one or more secondary luminaires via a particular hybrid, wired communication interface and an analog portion of a particular hybrid, wired communication link; at least one of (i) send, via the particular hybrid, wired communication interface and a digital portion of the particular, hybrid, wired communication link, a first administrative message to the particular secondary luminaire, or (ii) receive, via the particular hybrid, wired communication interface and the digital portion of the particular hybrid, wired communication link, a second administrative message from the particular secondary luminaire; and instruct the one or more drivers to energize the one or more illumination sources of the primary luminaire.

In an embodiment, a luminaire system is provided. The luminaire system comprises: one or more secondary luminaires, each of which is communicatively connected to a primary luminaire via a respective hybrid, wired communication interface, and each secondary luminaire of the one or more secondary luminaires including: respective one or more processors; respective one or more illumination sources; respective one or more drivers; the respective hybrid, wired communication interface communicatively connecting the each secondary luminaire to a respective hybrid communication link; and respective one or more memories storing a respective set of computer-executable instructions that, when executed by the respective one or more processors, cause the each secondary luminaire to: receive a driving command from the primary luminaire via the respective hybrid, wired communication interface and an analog portion of the respective hybrid, wired communication link; at least one of: (i) receive, via the respective hybrid, wired communication interface and a digital portion of the respective hybrid, wired communication link, a first administrative message from the primary luminaire, or (ii) send, via the respective hybrid, wired communication interface and the digital portion of the respective hybrid, wired communication link, a second administrative message to the primary luminaire; and instruct the respective one or more drivers to energize the respective one or more illumination sources of the each secondary luminaire based on the driving command from the primary luminaire.

In an embodiment, a method for delivering administrative messages in a luminaire system is provided. The method comprises: receiving, by a primary luminaire communicatively connected to one or more secondary luminaires via one or more hybrid wired communication interfaces and one or more hybrid wired communication links, multiple administrative messages from the one or more secondary luminaires via respective digital portions of the one or more hybrid wired communication links; generating, by the primary luminaire, based on the multiple administrative messages received from the one or more secondary luminaires, a single message having a content that is based on a combination of the multiple administrative messages received from the one or more secondary luminaires; sending, by the primary luminaire, to a controller via a wireless communication interface, the single message; and sending, by the primary luminaire, via respective analog portions of the one or more hybrid wired communication links, one or more driving commands to the one or more secondary luminaires.

DETAILED DESCRIPTION

Figure 1:
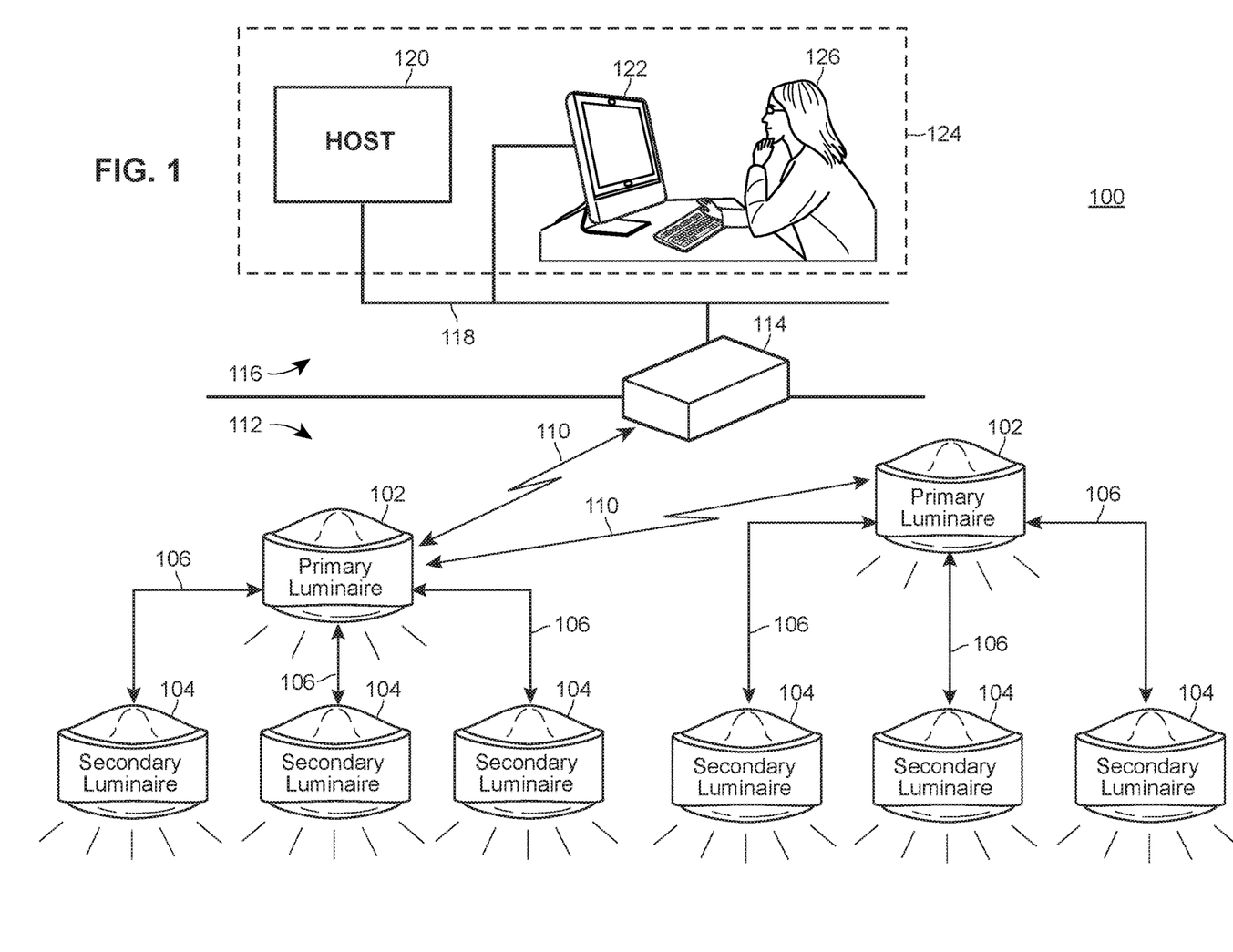
FIG. 1 illustrates an exemplary smart luminaire system.

FIG. 1 illustrates an exemplary smart luminaire system 100, in accordance with an embodiment. The terms "lighting unit", "light fixture", and "luminaire" are utilized interchangeably herein to refer to an electrically powered group of components that operate to supply general or ambient light and/or task or focused light in the portion of the electromagnetic spectrum that is visible to the human eye, e.g., from about 380 to 740 nanometers. In some examples, the exemplary smart luminaire system 100 may be disposed within a hazardous environment 100, such as an industrial process plant, a manufacturing facility, an oil refinery, a power-generating system, a mine, etc.

As shown in FIG. 1, the smart luminaire system 100 includes two luminaire groups. In other embodiments, the luminaire system may include any number of luminaire groups. Each luminaire group includes a primary luminaire 102 and a set of one or more secondary luminaires 104. As shown in FIG. 1, three secondary luminaires 104 are shown in each secondary luminaire set associated with each primary luminaire 102; however, in other embodiments, the luminaire system 100 may include any number of secondary luminaires (e.g., one or more secondary luminaires 104) connected to a given primary luminaire 102, and different groups of luminaires may include different numbers of secondary luminaires 104.

In each luminaire group, the primary luminaire 102 is communicatively connected to its respective secondary luminaires 104 via one or more hybrid wired communication interfaces to one or more hybrid wired communication links 106. The one or more hybrid wired communication links 106 may support a wired communication protocol that is suitable for (e.g., is in compliance with all regulations and standards that are applicable to) the hazardous environment in which the smart luminaire system 100 is disposed, such as wired HART®. Generally speaking, each hybrid wired communication link 106 includes an analog portion or component as well as a digital portion or component. For instance, the primary luminaire 102 may send one or more driving commands to a secondary luminaire 104 via its one or more on-board hybrid communication interfaces and the analog portion of a respective hybrid wired communication link 106, where the analog portion may operate at 0-10 V or 4-20 mA or at another suitable voltage/ampere range. In some examples, a single analog driving command from the primary luminaire may indicate a particular intensity setpoint for illumination sources of multiple or all of the secondary luminaires. The driving commands may include instructions for energizing and/or de-energizing the one or more on-board illumination sources of the secondary luminaire 104, and/or may include instructions that indicate respective intensities at which the one or more on-board illumination sources of the secondary luminaire 104 are to be energized. Furthermore, in some arrangements, the primary luminaire 102 may additionally or alternatively send driving commands to the secondary luminaires 104 via a purely analog wired communication link (not shown), e.g., that operates at 0-10 V or 4-20 mA, or at some other suitable voltage/ampere range.

Additionally, the primary luminaire 102 may send and receive administrative messages to and from a secondary luminaire 104 via its one or more hybrid communication interfaces and the digital portion of the respective hybrid wired communication link 106. The administrative messages may include alert messages, status messages, sensor data messages, configuration messages (e.g., that may include configuration instructions and/or configuration data), and/or other types of messages that do not control operations of illumination sources (e.g., that do not control energization, de-energization, and/or intensities of illumination sources). Furthermore, in some arrangements, the primary luminaire 102 may additionally or alternatively digitally send and receive administrative messages to and from the secondary luminaire 104 via a short range radio communication interface (not shown), such as an infrared, Bluetooth, or ZigBee® communication interface.

In some embodiments, the primary luminaire 102 communicates with one or more additional devices or nodes via a wireless communication interface to a wireless communication link 110. The wireless communication link 110 may support a communication protocol that is suitable for (e.g., is in compliance with all regulations and standards that are applicable to) the hazardous environment in which the smart luminaire system 100 is disposed, such as WirelessHart. For example, the primary luminaire 102 may receive driving commands and/or other types of control instructions from a controller or host 120 via the wireless communication link 110, and the primary luminaire 102 may send and receive administrative messages to and from the controller or host 120 via the wireless communication link 110. The driving commands sent from the controller 120 to the primary luminaire 102 may include instructions for energizing and/or de-energizing illumination sources on-board the primary luminaire 102 and/or illumination sources on-board the secondary luminaires 104, and/or may include instructions that indicate the respective intensities at which one or more on-board illumination sources of the secondary luminaries 104 are to be energized. As discussed above, administrative messages may include alerts, status updates, sensor readings, configuration information, and/or other types of messages that do not control operations of illumination sources (e.g., that do not control energization, de-energization, and/or intensities of illumination sources), and the administrative messages the primary luminaire 102 sends to the controller 120 may include administrative messages originating from the primary luminaire 102 as well as administrative messages originating from any of the secondary luminaries 104 (which may be consolidated into fewer number of messages, as is described in a later section). Additionally, in some examples, the primary luminaire 102 may send and receive driving commands and/or administrative messages to and from other primary luminaires 102 via the wireless communication link 110, e.g., via a wireless network 112 and the controller or host 120, or directly in a point-to-point manner via the wireless network 112 and/or the wireless link 110.

In embodiments, the primary luminaire 102 may be a node of a wireless network 112 of a hazardous environment, where the wireless network 112 includes other nodes such as other primary luminaires 102, and a wireless gateway 114 which communicatively interconnects the wireless network 112 and a wired network 116 associated with the hazardous environment. The wired network 116 includes a wired backbone 118 (e.g., which may be Ethernet, broadband, fiber optic, or any suitable type of wired backbone) to which a back-end server, host, controller, computing device, and/or group of computing devices behaving as a single logical server or host 120 is communicatively connected. The host 120 may be implemented by an individual computing device, by one or more controllers and/or systems associated with the hazardous environment (such as a programmable logic controller (PLC), distributed control system (DCS), or other type of industrial process control system), by a bank of servers, by a computing cloud, or by any suitable arrangement of one or more computing devices. The host 120 may service nodes of the wired network 116 and/or nodes of the wireless network 112. For example, the host 120 may provide (e.g., via download or other mechanism) configuration and/or operating instructions and/or data (e.g., that correspond to governing or controlling run-time lighting, diagnostic, maintenance, and/or other operations) to one or more nodes of the network(s) 112, 116, such as one or more of the primary luminaires 102, and/or other nodes.

Wired network 116 also includes a user computing device 122 which is communicatively connected via the backbone 118. The server 120 and the user computing device 122 may be disposed or located in one or more remote or enclosed locations 124 that protect the server 120 and the user computing device 122 from the harsh conditions of the hazardous environment. In some arrangements (not shown in FIG. 1), the protected user computing device 122 may be communicatively connected to the wired backbone 118 via a wireless link and access point, where the access point is communicatively connected in a wired manner to the backbone 118. A user 126 may utilize the computing device 122 to configure, modify, and/or otherwise provide instructions and/or data utilized by and/or stored at the host 120, and/or to view data and information provided by other devices and/or nodes via the wired network 116 and/or the wireless network 112 corresponding to the hazardous environment. For example, via the user computing device 122, the user 126 may add, delete, and/or modify driving commands and/or other control instructions for the primary luminaires 102 and/or for the secondary luminaires 104 on the fly as desired.

The wired network 116 and the wireless network 112 may be in compliance with applicable hazardous environment standards and regulations. For example, the wireless network 112 may utilize WirelessHART and/or one or more other communication protocols that are suitable for (e.g., is in compliance with all regulations and standards that are applicable to) the hazardous environment, and devices of the networks 112, 116 that are located at least partially within the hazardous environment (e.g., the primary luminaires 102, the secondary luminaires 104, the wireless gateway 114, the backbone 118, etc.) may similarly comply with all applicable hazardous environment standards and regulations that pertain to the hazardous environment.

Figure 2:
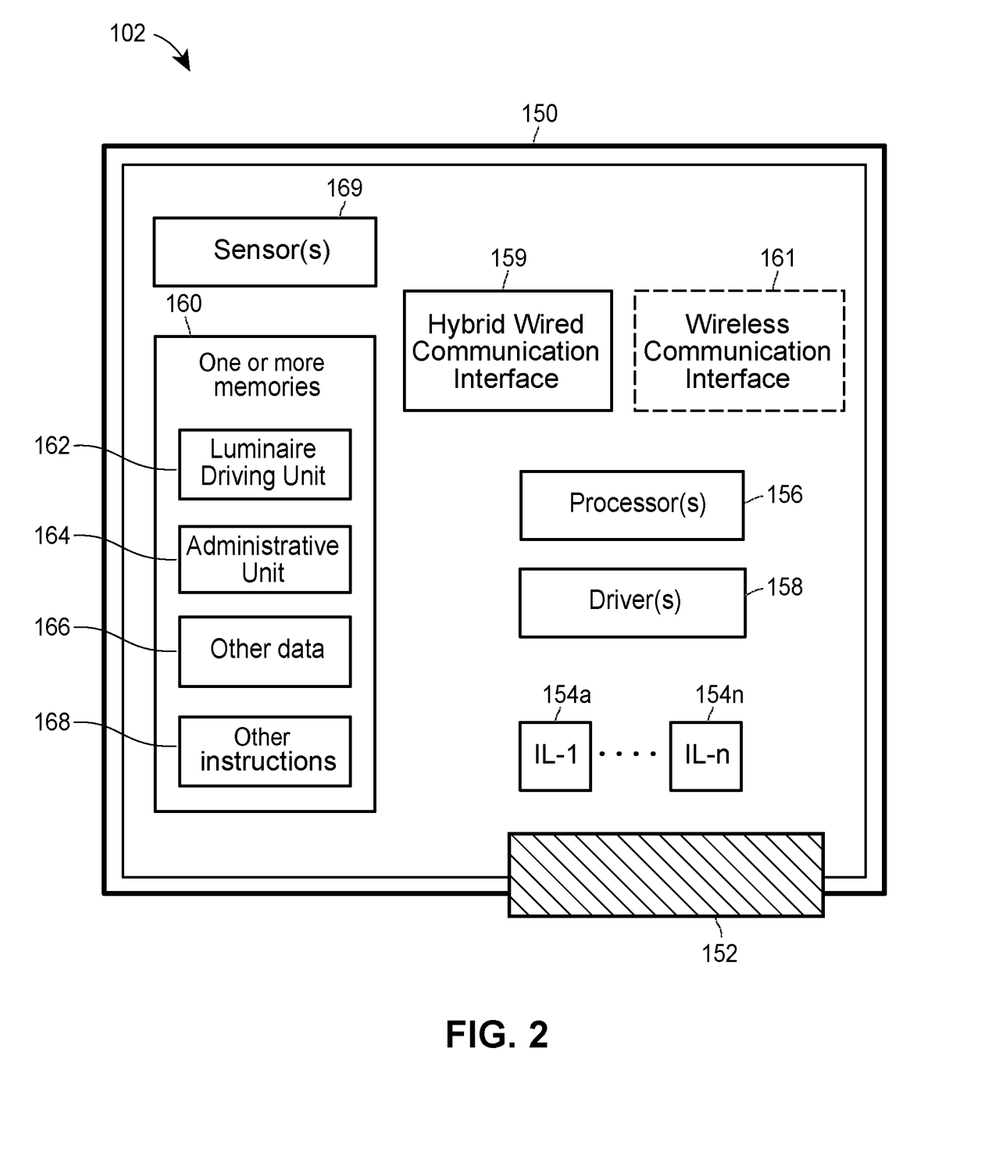
FIG. 2 is a block diagram of an exemplary primary luminaire that may be used in the exemplary smart luminaire system of FIG. 1.

FIG. 2 is a block diagram of an exemplary primary luminaire 102. In some examples, the primary luminaire 102 is a hazardous environment luminaire. That is, the primary luminaire 102 may be disposed within a hazardous environment 100, such as an industrial process plant, a manufacturing facility, an oil refinery, a power-generating system, a mine, etc. As such, the primary luminaire 102 may be a hazardous environment (HE) luminaire that is compliant with any (and in some cases, all) standards and/or regulations governing its configuration, installation, and usage within the hazardous environment. That is, the primary luminaire 102 complies with standard and/or regulated thermal and electrical limits so as to limit the energy generated by the primary luminaire 102 that is available for potential ignition and/or explosion within the hazardous environment. Further, the HE primary luminaire 102 includes at least one hazardous location enclosure or housing 150 in which its components are typically disposed or enclosed. For example, the hazardous location enclosure or housing 150 may be explosion-proof, flame-proof, water-proof, sealed, hermetically sealed, dust ignition protected, etc. In some embodiments of the primary luminaire 102 (not shown) a single primary luminaire 102 may include multiple hazardous location enclosures or housings 150, each of which surrounds a different subset of components of the primary luminaire 102; however, for ease of reading herein (and not for limitation purposes) the hazardous location enclosure or housing 150 is referred to using the singular tense. Moreover, at least one portion 152 of the hazardous location enclosure or housing 150 is at least partly transparent or visible light-permeable, so that illumination or light generated by one or more illumination sources IL-1 to IL-n (corresponding to references 154a-154n in FIG. 2) of the primary luminaire 102 is able to radiate into the hazardous environment. The illumination sources 154a-154n may be any suitable type of illumination source that generates visible light, e.g., incandescent, halogen, fluorescent, metal halide, xenon, LEDs (light emitting diodes), etc. Additionally, the primary luminaire 102 includes or is otherwise communicatively connected to one or more sensors 169 configured to capture sensor data associated with an environment of the primary luminaire.

In FIG. 2, the primary luminaire 102 includes one or more processors 156, one or more drivers 158 (e.g., drivers for illumination sources), and one or more illumination sources 154*a*-154*n* that are enclosed in, surrounded by, and/or otherwise protected by the hazardous location enclosure 150. Generally speaking, the one or more processors 156 instruct the one or more drivers 158 to energize or activate the one or more illumination sources 154*a*-154*n*, e.g., individually or independently, and/or as a set or group in a coordinated manner. For example, the one or more processors 156 may instruct the one or more drivers 158 to energize or activate the one or more illumination sources 154*a*-154*n* of the primary luminaire 102 based on driving commands from a controller 120. Moreover, the one or more processors 156 may generate driving commands for the secondary luminaire(s) 104 based on driving commands from the controller. In particular, the one or more processors 156 may send a driving command to at least one secondary luminaire 104 of the group of secondary luminaires 104 via an analog portion of a hybrid wired communication interface 159. Additionally, the one or more processors 156 may send administrative messages to (and/or receive administrative messages from) the secondary luminaires via the digital portion of the hybrid wired communication interface 159.

Furthermore, in some examples, the primary luminaire 102 may generate driving commands for itself and/or for the secondary luminaire 104 without receiving driving commands from a controller 120, e.g., when the primary luminaire 102 is not communicatively connected to any external controller, or in instances in which a wireless network that typically connects the primary luminaire 102 to an external controller is malfunctioning.

Figure 3:
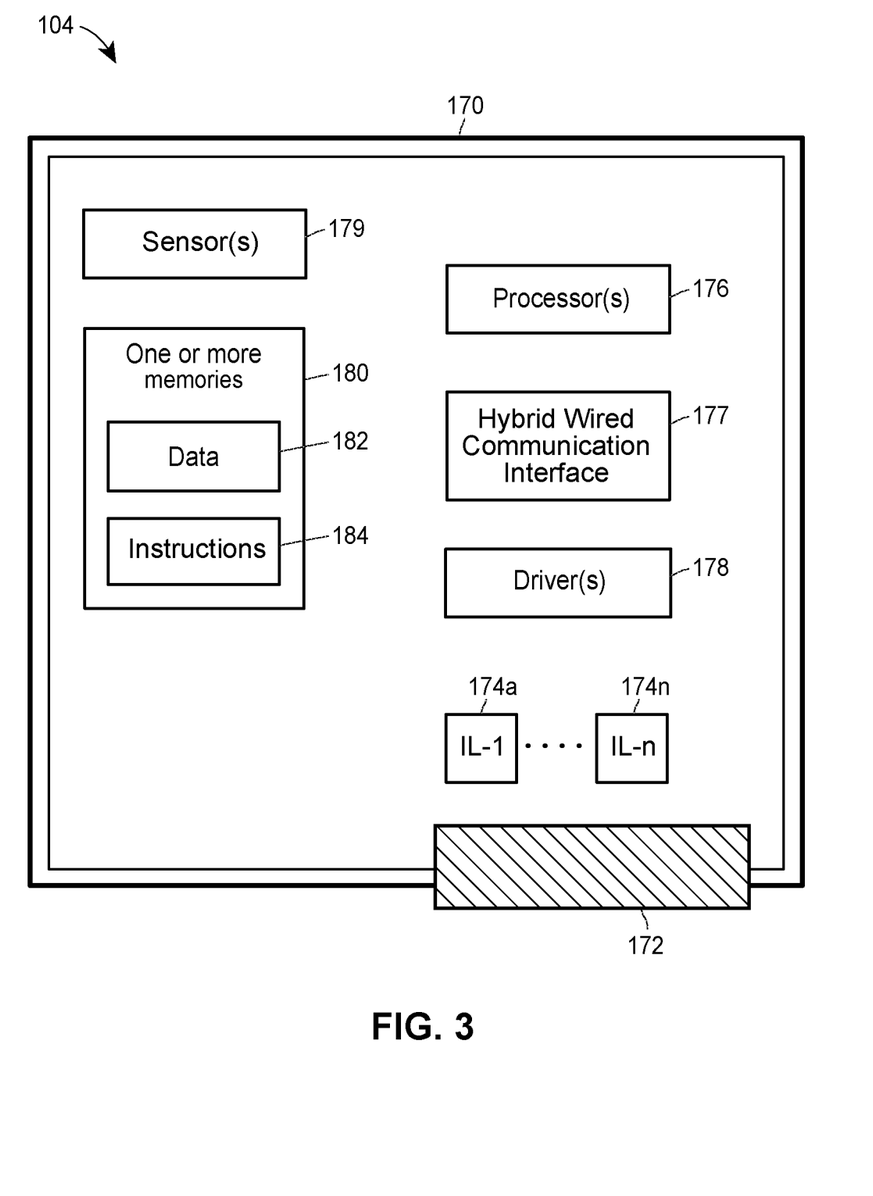
FIG. 3 is a block diagram of an exemplary secondary luminaire that may be used in the exemplary smart luminaire system of FIG. 1.

For instance, a luminaire driving unit 162 may be configured to cause the one or more processors 156 to instruct the one or more drivers 158 to energize or activate the one or more illumination sources 154*a*-154*n* of the primary luminaire 102 based on an analysis of sensor data from sensor(s) 169 of the primary luminaire 102, or based on an analysis of status updates (e.g., including sensor updates) of the secondary luminaires 104 delivered to the primary luminaire. For instance, the luminaire driving unit 162 may analyze ambient light data captured by sensors 169 of the primary luminaire 102 or the ambient light data captured by sensors 179 of the secondary luminaire 104, and may determine an appropriate intensity at which to energize or activate the one or more illumination sources 154*a*-154*n* based on the ambient light data. Furthermore, the luminaire driving unit 162 may generate driving commands for the secondary luminaires 104 based on the analysis of sensor data from sensor(s) 169 of the primary luminaire 102, or based on the analysis of status updates (e.g., including sensor updates) delivered from the secondary luminaires 104 to the primary luminaire 102. For example, the luminaire driving unit 162 may analyze ambient light data captured by sensors 169 of the primary luminaire 102 or sensors 179 of the secondary luminaire 104, and may determine an appropriate intensity at which the one or more illumination sources 174*a*-174*n* of the secondary luminaire 104 are to be energized and/or illuminated based on the ambient light data. Accordingly, the luminaire driving unit 162 may generate driving commands for the secondary luminaire 104 and deliver the driving commands to the secondary luminaire via the hybrid wired communication interface 159.

The luminaire driving unit 162 may include a set of computer-executable instructions that are executable by the one or more processors 156 and that are stored on the one or more memories 160 of the primary luminaire 102, where the one or more memories 160 are, for example, one or more tangible, non-transitory memories, components, or data storage devices. In some examples, one or more of the actions described as being performed by the luminaire driving unit 162 may be performed by additional or alternative applications or modules.

The one or more memories 160 may also store an administrative application 164. The administrative application 164 may be configured to cause the one or more processors 156 to group administrative messages that the primary luminaire 102 receives from the secondary luminaires 104 and deliver the grouped messages to an external controller via the wireless communication interface 161. For instance, the messages may be grouped based on urgency, based on the type of message or type of sensor associated with each message, based on which secondary luminaire 104 sent each message, based on the locations of secondary luminaires 104 sending each message, etc.

In some arrangements, the one or more memories 160 may also store other data 166 that is accessible to the one or more processors 156 and/or other computer-executable instructions 168 that are executable by the one or more processors 156 to cause primary luminaire 102 perform other operations in addition to generating driving commands and grouping administrative messages for transmission. For example, the other computer-executable instructions 125 may be executable by the one or more processors 156 to cause the primary luminaire 102 perform its run-time lighting operations, to execute diagnostic and/or maintenance operations, etc.

Generally speaking, as discussed with respect to FIG. 1, the primary luminaire 102 is communicatively connected to one or more secondary luminaires 104 via a hybrid wired communication interface 159. In some examples, the primary luminaire 102 may be communicatively connected to a wired network, e.g., via the same hybrid wired communication interface 159 connecting the luminaires to one another, or via an additional or alternative wired communication interface (not shown). Similarly, in some examples, the primary luminaire 102 may also be communicatively connected to a wireless network via a wireless communication interface 161, such as WirelessHART. As such, the primary luminaire 102 may be a node of a wired network and/or may be a node of a wireless network. Each of the wireless and/or wired networks may include one or more other nodes such as, for example, a back-end computer, controller, or server that is disposed in a non-hazardous environment or otherwise is shielded from the harsh conditions of the hazardous environment. Other examples of nodes which may be included in the wireless and/or wired network may include, in some configurations, one or more other luminaires, sensors, and other devices disposed within the hazardous environment.

FIG. 3 is a block diagram of an exemplary secondary luminaire 104. As discussed in greater detail with respect to the primary luminaire 102, in some examples, the secondary luminaire 104 is a hazardous environment luminaire, and includes at least one hazardous location enclosure or housing 170 (e.g., similar to hazardous location enclosure or housing 150) in which its components are typically disposed or enclosed. Moreover, as discussed in greater detail with respect to the primary luminaire 102, at least one portion 172 of the hazardous location enclosure or housing 170 of the secondary luminaire 104 is at least partly transparent or visible light-permeable, so that illumination or light generated by one or more illumination sources IL-1 to IL-n (corresponding to references 174*a*-174*n* in FIG. 3) of the secondary luminaire 104 is able to radiate into the hazardous environment. The illumination sources 174*a*-174*n* may be any suitable type of illumination source that generates visible light, e.g., incandescent, halogen, fluorescent, metal halide, xenon, LEDs (light emitting diodes), etc.

In FIG. 3, the secondary luminaire 104 includes one or more processors 176, one or more drivers 178 (e.g., drivers for illuminations sources), and one or more illumination sources 174a-174n that are enclosed in, surrounded by, and/or otherwise protected by the hazardous location enclosure 170. Generally speaking, the one or more processors 176 instruct the one or more drivers 178 to energize or activate the one or more illumination sources 174a-174n, e.g., individually or independently, and/or as a set or group in a coordinated manner. In particular, the one or more processors 176 may receive driving commands from the primary luminaire 102 via an analog portion of a hybrid wired communication interface 177, and may instruct the one or more drivers 178 to energize or activate the one or more illumination sources 174a-174n of the secondary luminaire 104 based the driving commands. Furthermore, the one or more processors 176 may receive administrative messages from (and/or send administrative messages to) the primary luminaire via a digital portion of the hybrid wired communication interface 177. For instance, as discussed above, the administrative messages may include alert messages, status messages, sensor data messages, and/or configuration messages (e.g., including configuration instructions and/or configuration data). For example, the secondary luminaire 104 may include or may otherwise be communicatively connected to one or more sensors 179 configured to capture sensor data associated with an environment of the secondary luminaire 104, and the administrative messages may include data captured by the one or more sensors 179.

Additionally, one or more memories 180 of the secondary luminaire 104 may store data 182 that is accessible to the one or more processors 176 and/or computer-executable instructions 184 that are executable by the one or more processors 176 to cause the secondary luminaire 104 to perform its run-time lighting operations, to execute diagnostic and/or maintenance operations, etc.

Figure 4:
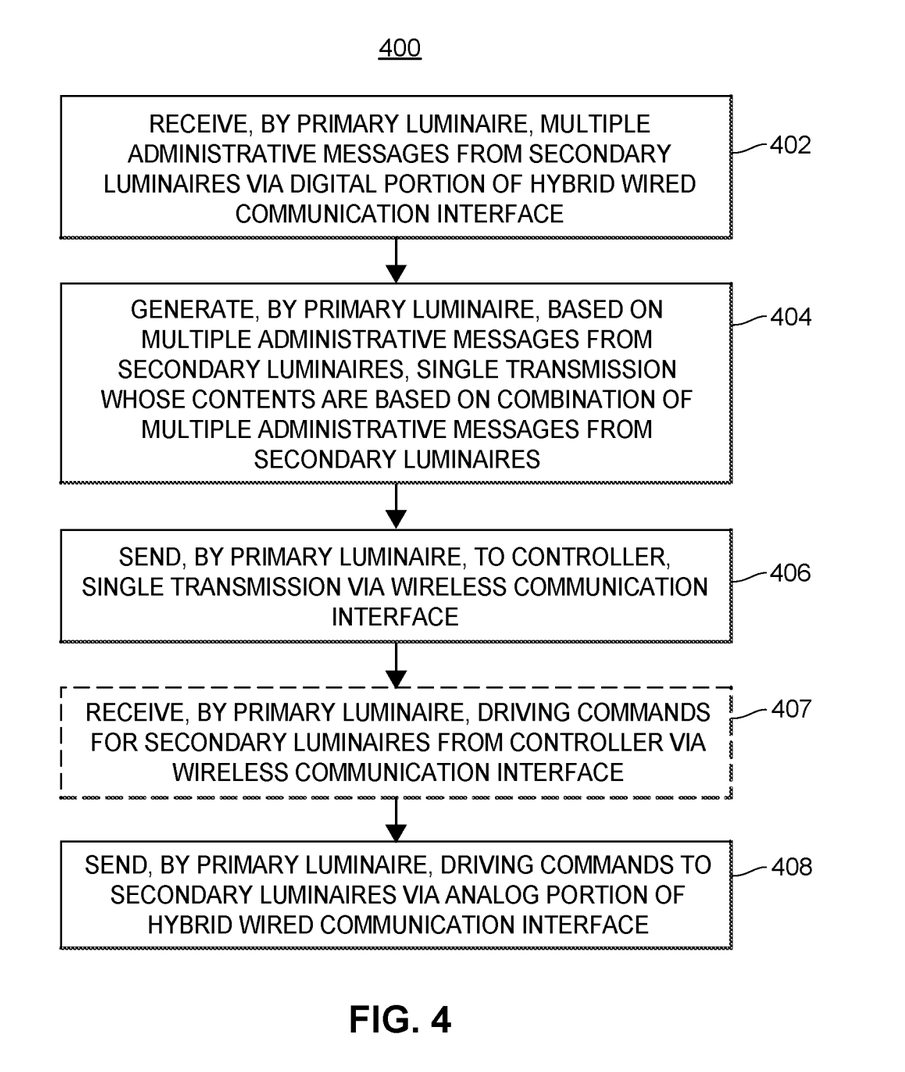
FIG. 4 is a flow diagram of an exemplary method of communication in a smart luminaire system.

FIG. 4 is a flow diagram of an exemplary method 400 of communication in a smart luminaire system. One or more steps of the method 400 may be implemented as a set of instructions stored on a computer-readable memory and executable on one or more processors. For example, at least a portion of the method 400 may be implemented by the instructions 162, 164, and/or 168 of the primary luminaire 102, for example.

The method 400 may begin when a primary luminaire communicatively connected to one or more secondary luminaires via a wired communication interface receives (block 402) multiple administrative messages from the one or more secondary luminaires via a digital portion of the hybrid wired communication interface. For example, the administrative messages may include, e.g., alert messages, status messages, sensor data, and/or configuration messages.

Based on the multiple administrative messages from the one or more secondary luminaires, the primary luminaire may generate (block 404) a single transmission whose contents are based on a combination and/or a consolidation of the multiple administrative messages from the one or more secondary luminaires. For example, the primary luminaire may combine and/or consolidate the multiple administrative messages into the single transmission based on an urgency associated with each administrative message, a type of administrative message or a type of sensor associated with each administrative message, an indication of which secondary luminaire sent each administrative message, an indication of a location of the secondary luminaire associated with each message, contents of the various administrative messages, etc.

For instance, the single transmission or message may be a single status message containing an indication of status messages associated with multiple of the plurality of secondary luminaires. As another example, the single transmission or message may be a single alarm or alert message containing an indication of alerts or alarms associated with multiple of the plurality of secondary luminaires.

The primary luminaire may send (block 406) the single transmission to a controller or host (e.g., the controller or host 120) via a wireless communication interface. Advantageously, the total number of transmissions sent by luminaires over the wireless network may be decreased, decreasing latency of other urgent messages that may be sent over the network. In particular, this feature allows for the implementation of a large scale smart luminaire system without significantly impacting the speed with which alerts and other critical messages related to spills or other safety conditions within the plant are communicated over the wireless network.

Optionally, in some examples, the primary luminaire may receive (block 407) driving commands for the one or more secondary luminaires from the controller or host via the wireless communication interface. For example, the controller or host may generate driving commands for the secondary luminaires based on transmissions received from the primary luminaire. In other examples, the controller or host may generate driving commands for the secondary luminaires independently of transmissions received from the primary luminaire.

Additionally, the primary luminaire may send (block 408) driving commands to the one or more secondary luminaires via an analog portion of the hybrid wired communication interface. In some examples, these driving commands may be based on driving commends that the primary luminaire receives from the controller or host at block 407. In other examples, the primary luminaire may generate driving commands for the secondary luminaires independently of any controller or host.

The following additional considerations apply to the foregoing discussion.

Certain embodiments are described in this disclosure as including logic or a number of components or modules. Modules may be software modules (e.g., code stored on non-transitory machine-readable medium) or hardware modules. A hardware module is a tangible, non-transitory unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc.

The software can be executed by one or more general-purpose processors or one or more special-purpose processors.

Upon reading this disclosure, those of skill in the art will appreciate still additional alternative structural and functional designs for communications between hazardous environment lighting units, light fixtures, or luminaires through the principles disclosed in this disclosure. Thus, while this document illustrates and describes particular embodiments and applications, the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

What is claimed is:

1. A luminaire system, comprising:
   a primary luminaire communicatively connected to one or more secondary luminaires via one or more hybrid, wired communication interfaces to one or more hybrid wired communication links, the primary luminaire including:
      one or more processors;
      one or more illumination sources;
      one or more drivers;
      the one or more hybrid, wired communication interfaces; and
      one or more memories storing a set of computer-executable instructions that, when executed by the one or more processors, cause the primary luminaire to:
         send a driving command to a particular secondary luminaire of the one or more secondary luminaires via a particular hybrid, wired communication interface and an analog portion of a particular hybrid, wired communication link;
         at least one of (i) send, via the particular hybrid, wired communication interface and a digital portion of the particular, hybrid, wired communication link, a first administrative message to the particular secondary luminaire, or (ii) receive, via the particular hybrid, wired communication interface and the digital portion of the particular hybrid, wired communication link, a second administrative message from the particular secondary luminaire; and
         instruct the one or more drivers to energize the one or more illumination sources of the primary luminaire.

2. The luminaire system of claim 1, wherein the primary luminaire is communicatively connected to one or more sensors configured to capture sensor data associated with an environment in which the primary luminaire and the particular secondary luminaire is disposed.

3. The luminaire system of claim 2, wherein the instruction of the one or more drivers to energize the one or more illumination sources of the primary luminaire is based on the captured sensor data.

4. The luminaire system of claim 2, wherein the driving command sent to the particular secondary luminaire is based on the captured sensor data.

5. The luminaire system of claim 1, wherein the instruction of the one or more drivers to energize the one or more illumination sources of the primary luminaire is based on the second administrative message received from the particular secondary luminaire.

6. The luminaire system of claim 1, wherein the driving command sent to the particular secondary luminaire is based on the second administrative message received from the particular secondary luminaire.

7. The luminaire system of claim 1, wherein the primary luminaire further includes a wireless communication interface.

8. The luminaire system of claim 7, wherein the set of computer-executable instructions, when executed by the one or more processors, further cause the primary luminaire to at least one of: (i) send, via the wireless communication interface, a third administrative message to a controller or host, or (ii) receive, from the controller or host, via the wireless communication interface, a fourth administrative message.

9. The luminaire system of claim 8, wherein the third administrative message is related to at least one secondary luminaire of the one or more secondary luminaires.

10. The luminaire system of claim 7, wherein the primary luminaire is configured to receive, from a controller, via the wireless communication interface, one or more driving commands for the primary luminaire and/or one or more driving commands for the particular secondary luminaire of the one or more secondary luminaires.

11. The luminaire system of claim 10, wherein the instruction of the one or more drivers to energize the one or more illumination sources of the primary luminaire is based on at least one driving command received at the primary luminaire from the controller or host.

12. The luminaire system of claim 1, wherein each of the first administrative message and the second administrative message respectively includes one or more of an alert message, a status message, sensor data, or a configuration message.

13. The luminaire system of claim 1, wherein the particular secondary luminaire includes:
   one or more processors;
   one or more illumination sources;
   one or more drivers;
   a hybrid, wired communication interface to the particular hybrid, wired communication interface; and
   one or more memories storing a set of computer-executable instructions that, when executed by the one or more processors, cause the particular secondary luminaire to:
      receive the driving command from the primary luminaire via the hybrid wired communication interface of the particular secondary luminaire and the analog portion of the particular hybrid, wired communication link;
      at least one of (i) receive, via the hybrid wired communication interface of the particular secondary luminaire and the digital portion of the particular hybrid, wired communication link, the first administrative message from the primary luminaire, or (ii) send, via the hybrid wired communication interface of the particular secondary luminaire and the digital portion of the particular hybrid, wired communication link, the second administrative message to the primary luminaire; and
      instruct the one or more drivers of the particular secondary luminaire to energize the one or more illumination sources of the secondary luminaire based on the driving command received from the primary luminaire.

14. The luminaire system of claim 1, wherein at least one secondary luminaire of the one or more secondary luminaires is communicatively connected to one or more sensors configured to capture sensor data associated with an environment in which the one or more secondary luminaires are positioned.

15. The luminaire system of claim 1, wherein the primary luminaire and the one or more secondary luminaires are disposed in a hazardous environment, and wherein each of the primary luminaire and the one or more secondary luminaires includes a respective hazardous location enclosure in which the respective one or more processors, the respective one or more illumination sources, and the respective one or more drivers of the each of the primary luminaire and the one or more secondary luminaires are disposed.

16. The luminaire system of claim 1, wherein the set of computer-executable instructions, when executed by the one or more processors, further cause the primary luminaire to:
receive multiple administrative messages from the one or more secondary luminaires;
generate, based on the multiple administrative messages received from the one or more secondary luminaires, a single transmission whose contents are based on a combination of the multiple administrative messages received from the one or more secondary luminaires; and
send, to a controller, via a wireless communication interface, the single transmission.

17. The luminaire system of claim 1, wherein the hybrid wired communication link supports a wired Highway Addressable Remote Transducer (HART) communication protocol.

18. A luminaire system, comprising:
one or more secondary luminaires, each of which is communicatively connected to a primary luminaire via a respective hybrid, wired communication interface, and each secondary luminaire of the one or more secondary luminaires including:
respective one or more processors;
respective one or more illumination sources;
respective one or more drivers;
the respective hybrid, wired communication interface communicatively connecting the each secondary luminaire to a respective hybrid communication link; and
respective one or more memories storing a respective set of computer-executable instructions that, when executed by the respective one or more processors, cause the each secondary luminaire to:
receive a driving command from the primary luminaire via the respective hybrid, wired communication interface and an analog portion of the respective hybrid, wired communication link;
at least one of: (i) receive, via the respective hybrid, wired communication interface and a digital portion of the respective hybrid, wired communication link, a first administrative message from the primary luminaire, or (ii) send, via the respective hybrid, wired communication interface and the digital portion of the respective hybrid, wired communication link, a second administrative message to the primary luminaire; and
instruct the respective one or more drivers to energize the respective one or more illumination sources of the each secondary luminaire based on the driving command from the primary luminaire.

19. The luminaire system of claim 18, wherein at least one secondary luminaire of the one or more secondary luminaires is communicatively connected to one or more sensors configured to capture sensor data associated with an environment in which the one or more secondary luminaires are positioned, and the second administrative message includes sensor data captured by the one or more sensors.

20. The luminaire system of claim 18, wherein the primary luminaire further includes a wireless communication interface.

21. The luminaire system of claim 20, wherein the primary luminaire is further configured to: (i) send, via the wireless communication interface, a third administrative message to a controller, the third administrative message based on multiple administrative messages generated by the one or more secondary luminaires, or (ii) receive, from the controller, via the wireless communication interface, a fourth administrative message.

22. The luminaire system of claim 21, wherein at least one of: the third administrative message is related to at least one secondary luminaire of the one or more secondary luminaires, or the driving command is based on the fourth administrative message.

23. A method for delivering administrative messages in a luminaire system, the method comprising:
receiving, by a primary luminaire communicatively connected to one or more secondary luminaires via one or more hybrid wired communication interfaces and one or more hybrid wired communication links, multiple administrative messages from the one or more secondary luminaires via respective digital portions of the one or more hybrid wired communication links;
generating, by the primary luminaire, based on the multiple administrative messages received from the one or more secondary luminaires, a single message having a content that is based on a combination of the multiple administrative messages received from the one or more secondary luminaires;
sending, by the primary luminaire, to a controller via a wireless communication interface, the single message; and
sending, by the primary luminaire, via respective analog portions of the one or more hybrid wired communication links, one or more driving commands to the one or more secondary luminaires.

24. The method of claim 23, wherein receiving the multiple administrative messages includes receiving two or more of: alert messages, status messages, sensor data, or configuration messages.

25. The method of claim 23, wherein generating the single message having the content based on the combination of the multiple administrative messages from the one or more secondary luminaires includes generating the single message based on at least one of: respective urgencies associated with the multiple administrative messages, respective types of the multiple administrative messages, a type of sensor, respective identities of the one or more secondary luminaires, or respective locations of the one or more secondary luminaires.

26. The method of claim 23, wherein generating the single message having the content based on the combination of the multiple administrative messages from the one or more secondary luminaires includes generating a single status message containing an indication of status messages associated with multiple of the plurality of secondary luminaires.

27. The method of claim 23, wherein generating the single message having the content based on the combination of the multiple administrative messages from the one or more secondary luminaires includes generating a single alert message containing an indication of alert messages associated with multiple of the plurality of secondary luminaires.

\* \* \* \* \*